US012713207B2

(12) United States Patent
Tucker

(10) Patent No.: US 12,713,207 B2
(45) Date of Patent: Aug. 18, 2026

(54) SYSTEMS AND METHODS FOR MONITORING OF ENTITIES

(71) Applicant: T-Mobile USA, Inc., Bellevue, WA (US)

(72) Inventor: Wilfred I. Tucker, Centennial, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 336 days.

(21) Appl. No.: 18/454,745

(22) Filed: Aug. 23, 2023

(65) Prior Publication Data

US 2025/0071516 A1 Feb. 27, 2025

(51) Int. Cl.
*H04W 4/029* (2018.01)
*H04W 4/021* (2018.01)

(52) U.S. Cl.
CPC ........... *H04W 4/029* (2018.02); *H04W 4/021* (2013.01)

(58) Field of Classification Search
CPC ..... H04W 4/029; H04W 4/021; H04W 4/022; H04W 4/02; H04W 4/025; H04W 4/023; H04W 4/027; H04W 64/00; H04W 4/50; H04W 4/80; H04W 4/024; H04W 4/40; H04W 4/90; H04W 64/006; H04W 84/12; H04W 4/21; H04W 4/48; H04W 48/14; H04W 52/0251; H04W 4/185; H04W 88/02; H04W 48/04; H04W 8/18; H04W 12/08; H04W 4/30; H04W 4/44; H04W 60/04; H04W 76/50; H04W 52/0229; H04W 68/00; H04W 68/005; H04W 4/33; H04W 12/64; H04W 36/32; G06Q 30/0261; G06Q 50/01; G06Q 30/0259; G06Q 30/0205; G06Q 30/0267; G06Q 10/0833; H04L 67/535; H04L 67/306;
(Continued)

(56) References Cited

U.S. PATENT DOCUMENTS

| | | | |
|---|---|---|---|
| 8,219,094 | B2 | 7/2012 | Huber et al. |
| 8,295,855 | B2 | 10/2012 | Narayan et al. |

(Continued)

FOREIGN PATENT DOCUMENTS

| | | | |
|---|---|---|---|
| CN | 107533421 | B | 12/2020 |
| CN | 110679162 | B | 1/2021 |

(Continued)

*Primary Examiner* — Jing Gao
(74) *Attorney, Agent, or Firm* — Perkins Coie LLP

(57) ABSTRACT

Systems and methods for monitoring an entity within a threshold distance of a mobile device are disclosed. The method includes receiving, such as via a user interface of the mobile device, information indicative of a boundary around the mobile device. The method includes receiving a set of signals from a second device, wherein each of the set of signals comprise a location of the second device. Upon determining that a current location of the second device is within a boundary buffer value from the boundary around the mobile device, the method may include transmitting a response signal to the second device, wherein the response signal is capable of providing feedback to an entity associated with the second device. The feedback may deter the entity from moving beyond the boundary around the mobile device and may comprise at least one of an audio signal, a video signal, or a haptic signal.

20 Claims, 7 Drawing Sheets

(58) Field of Classification Search

CPC .. H04L 51/222; H04L 43/16; H04M 1/72457; H04M 2250/10; G01S 19/42; G01S 19/01; G01S 5/0221; G01S 5/0009; G01S 19/48; G01S 5/0284

See application file for complete search history.

(56) References Cited

U.S. PATENT DOCUMENTS

| | | | |
|---|---|---|---|
| 8,385,944 | B1 | 2/2013 | Nelissen |
| 8,396,470 | B2 | 3/2013 | Wormald |
| 8,428,620 | B2 | 4/2013 | Sweeney et al. |
| 8,467,808 | B1 | 6/2013 | Shaw |
| 8,611,928 | B1 | 12/2013 | Bill |
| 9,441,979 | B2 | 9/2016 | Barnard et al. |
| 9,607,285 | B1 | 3/2017 | Wellman |
| 9,716,974 | B2 | 7/2017 | Yamasaki et al. |
| 9,866,998 | B2 | 1/2018 | Cheung et al. |
| 9,927,249 | B2 | 3/2018 | Barnard et al. |
| 10,002,515 | B2 | 6/2018 | De Barros Chapiewski et al. |
| 10,271,172 | B2 | 4/2019 | De Barros Chapiewski et al. |
| 10,366,366 | B1 | 7/2019 | Wellman |
| 10,416,311 | B2 | 9/2019 | Huang et al. |
| 10,475,328 | B2 | 11/2019 | Doxey et al. |
| 10,623,911 | B1 | 4/2020 | Delaney et al. |
| 10,757,540 | B1 | 8/2020 | Klinkner et al. |
| 10,796,548 | B2 | 10/2020 | Adoni Mohammed et al. |
| 10,820,159 | B1 | 10/2020 | Zimroni et al. |
| 10,887,937 | B2 | 1/2021 | Raphael |
| 10,917,746 | B2 | 2/2021 | De Barros Chapiewski et al. |
| 10,962,942 | B2 | 3/2021 | Richardson et al. |
| 11,175,407 | B2 | 11/2021 | Huang et al. |
| 11,202,174 | B2 | 12/2021 | Klinkner et al. |
| 11,448,773 | B2 | 9/2022 | Bennett |
| 11,509,642 | B2 | 11/2022 | Colon et al. |
| 11,526,834 | B2 | 12/2022 | Conlon |
| 11,675,089 | B2 | 6/2023 | Bennett |
| 2010/0279706 | A1 | 11/2010 | Dicke |
| 2014/0200929 | A1 | 7/2014 | Fitzgerald et al. |
| 2021/0105580 | A1 | 4/2021 | Klinkner et al. |
| 2021/0132784 | A1 | 5/2021 | Conlon et al. |
| 2021/0243565 | A1* | 8/2021 | Stark ....................... G01S 19/18 |
| 2022/0053296 | A1 | 2/2022 | Klinkner et al. |
| 2022/0198434 | A1 | 6/2022 | Tu |
| 2022/0279760 | A1* | 9/2022 | Ehrman ............... A01K 15/023 |
| 2023/0140029 | A1 | 5/2023 | Caputo et al. |
| 2023/0206306 | A1 | 6/2023 | Sloan et al. |

FOREIGN PATENT DOCUMENTS

| | | | |
|---|---|---|---|
| CN | 108337907 | B | 5/2021 |
| DE | 202016006041 | U1 | 12/2016 |
| EP | 1986457 | B1 | 6/2010 |
| EP | 2211583 | B1 | 6/2011 |
| EP | 3465646 | A1 | 4/2019 |
| EP | 3170349 | B1 | 11/2019 |
| EP | 3785458 | A1 | 3/2021 |
| JP | WO2016009579 | A1 | 5/2017 |
| JP | 6580703 | B2 | 9/2019 |
| KR | 101912167 | B1 | 10/2018 |
| KR | 20180121643 | A | 11/2018 |
| KR | 102047432 | B1 | 11/2019 |
| KR | 102108487 | B1 | 5/2020 |
| WO | 2017210002 | A1 | 12/2017 |
| WO | 2021206947 | A1 | 10/2021 |

* cited by examiner

SYSTEMS AND METHODS FOR MONITORING OF ENTITIES

BACKGROUND

Monitoring of entities, such as mobile entities capable of autonomous movement (e.g., children and pets) is a critical yet challenging task for many caregivers and/or parents. Continuous and accurate monitoring of location and environment is important to caregivers to ensure the safety of the child or pet.

Tools for monitoring entities like pets, children, or high-value assets may incorporate positional tracking, visual information regarding entities, and/or digital movement of the user. For example, monitors, such as baby alarms, employ radio systems to remotely listen to sounds made by an infant. An audio monitor consists of a transmitter unit, equipped with a microphone, placed near to the child. It transmits the sounds by radio waves to a receiver unit with a speaker carried by, or near to, the person caring for the infant. A monitor with a video camera and receiver is often called a baby cam.

GPS animal tracking is another process whereby biologists, scientific researchers, or conservation agencies can remotely observe relatively fine-scale movement or migratory patterns animals using the Global Positioning System (GPS) and optional environmental sensors or automated data-retrieval technologies such as Argos satellite uplink, mobile data telephony or GPRS and a range of analytical software tools. A GPS tracking device will generally record and store location data at a pre-determined interval or on interrupt by an environmental sensor. GPS tracking devices may also be attached to domestic animals, such as pets, pedigree livestock and working dogs. Some owners use these collars for geofencing of their pets.

However, many conventional systems are technologically ineffective under dynamic circumstances. For example, conventional systems fail to provide continuous monitoring capabilities in various indoor and outdoor environments, are limited in the information provided to a user (e.g., caregiver, parent), and also fail to provide users with the ability to remotely act upon detected changes in the mobile entity's environment (e.g., environment of a child or pet, etc.).

BRIEF DESCRIPTION OF THE DRAWINGS

Detailed descriptions of implementations of the present invention will be described and explained through the use of the accompanying drawings.

Figure 1A:
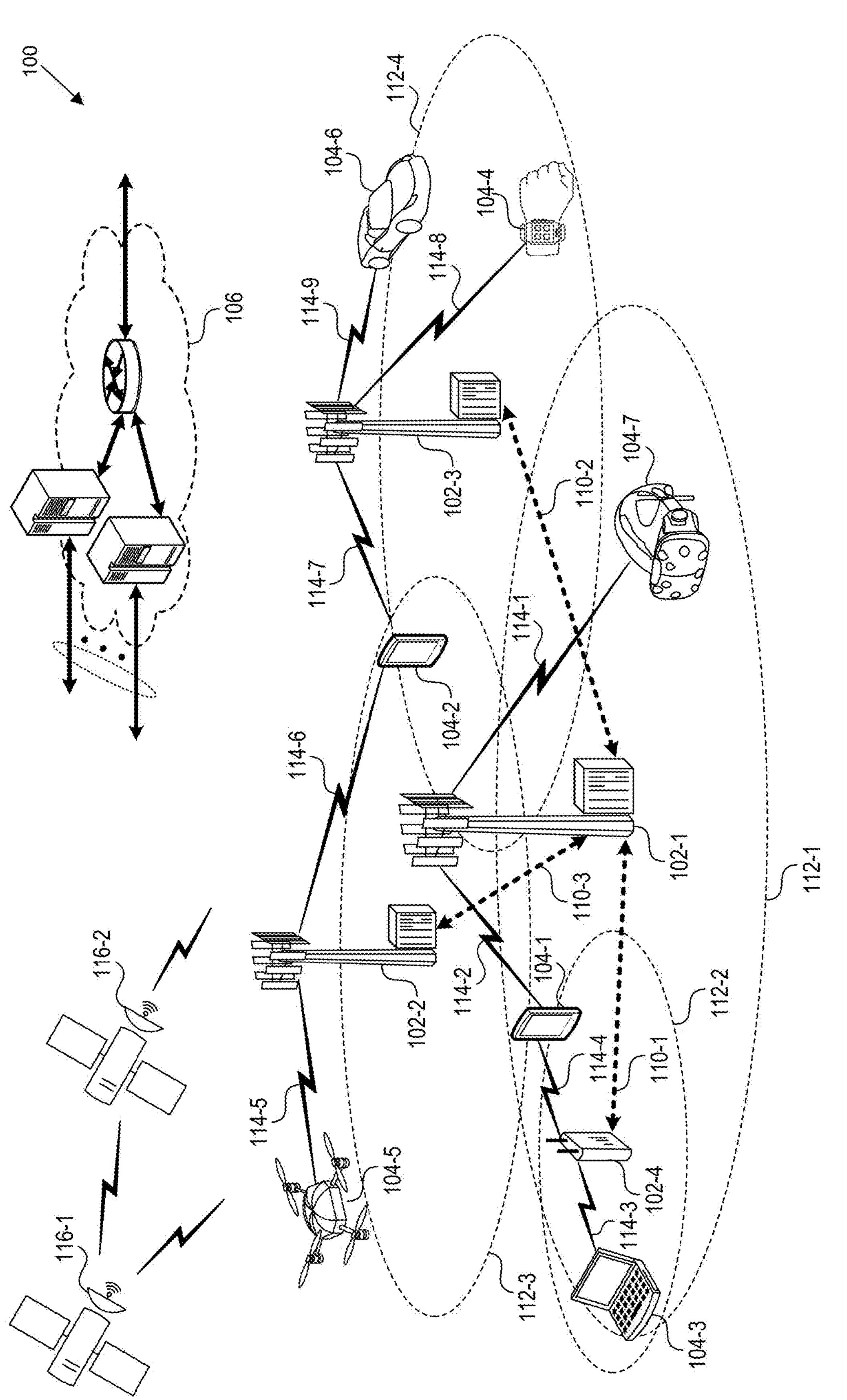
FIG. 1A is a diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Monitoring of mobile entities capable of autonomous and/or independent movement, such as children and pets, or mobile high asset goods is a critical task for many users. For example, such systems are often used by caregivers and/or parents to ensure a child's and/or pet's safety in their current surroundings, so that caregivers and/or parents can be alerted as to changes in a child's or pet's environment. Knowing the current environment of a mobile entity enables parents or caregivers to ensure safety of the mobile entity and respond promptly to any changes or emergencies that occur. However, many conventional systems are technologically ineffective under dynamic circumstances considering a range of factors. For example, conventional systems fail to provide continuous monitoring capabilities, are limited in the information provided to a user (e.g., caregiver, parent), and also fail to provide users with the ability to remotely act upon detected changes in the mobile entity's environment (e.g., environment of a child or pet, etc.).

For example, although traditional GPS-based tracking exists, simple GPS-based tracking systems can become ineffective inside buildings where the signals do not penetrate well. GPS-based systems also become ineffective even outside under certain environmental factors, such as tall buildings, dense foliage, and/or the like, which often cause signal disruptions or inaccurate location data. Similarly, camera monitoring systems typically provide a narrow or limited field of view using a few cameras or necessitate multiple cameras to operate at the same time. Operating many cameras at the same time causes significantly higher energy expenditure such as higher processing power and computational cost. Such systems also fail to provide interaction between users, the mobile entities, and their environments.

Accordingly, a mechanism is desired that would enable users to monitor an entity, such as a pet, within a threshold distance of a mobile device. For example, a mechanism is desired that further provides users with a system for continuous monitoring (e.g., seamless monitoring) that can provide visual data, and that can provide feedback or other interactions between a user and the entity. One mechanism to enable users to monitor an entity can include receiving, such as via a user interface of the mobile device, information indicative of a boundary around the mobile device. A set of signals may be received from a second device, wherein each of the set of signals comprise a location of the second device.

Upon determining that a current location of the second device is within a boundary buffer value from the boundary around the mobile device, a response signal can be transmitted to the second device, wherein the response signal is capable of providing feedback to an entity associated with the second device. The feedback may deter the entity from moving beyond the boundary around the mobile device and may comprise at least one of an audio signal, a video signal, or a haptic signal.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1A is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WW/VAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi® and Core architecture to increase and improve indoor coverage.

Exemplary System and Environment for Monitoring Entities

Figure 1B:
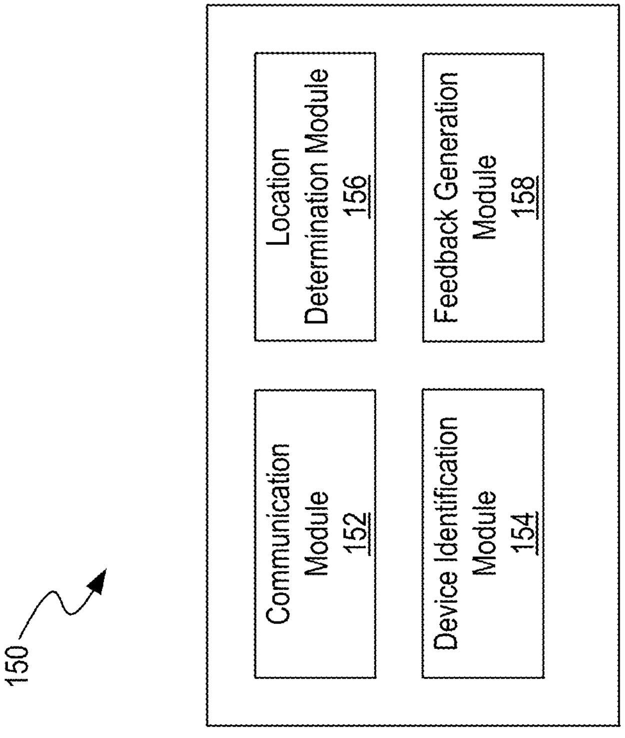
FIG. 1B is a diagram of an exemplary system for monitoring an entity within a threshold distance of a mobile device, in accordance with implementations of the present technology.

FIG. 1B is a diagram of an exemplary system for monitoring an entity within a threshold distance of a mobile device, in accordance with implementations of the present technology. The diagram of FIG. 1B may illustrate the components of an exemplary monitoring system 150. The monitoring system 150 can include functional modules that are implemented with a combination of software (e.g., executable instructions, or computer code) and hardware (e.g., at least a memory and processor). Aspects of the monitoring system 150 may be performed by a mobile device of the user, e.g., such as devices 212, 232, and 250.

Accordingly, as used herein, in some examples a module is a processor-implemented module or set of code, and represents a computing device having a processor that is at least temporarily configured and/or programmed by executable instructions stored in memory to perform one or more of the specific functions described herein. For example, the monitoring system 150 includes a communication module 152, a device identification module 154, a location determination module 156, and feedback generation module 158, each of which is discussed separately below.

Communication module 152 of monitoring system 150 can include software and/or hardware components allowing for the transmission and/or receipt of information between two or more devices. Communication module 152 can include a wireless communication module, such as a cellular radio or Wi-Fi® antenna, to allow for communication over wireless networks, and/or can additionally or alternatively include a network card (e.g., a wireless network card and/or a wired network card) that is associated with software to drive the card.

The communication module 152 is configured and/or programmed (e.g., via the above-mentioned techniques) to interface between a user device (e.g., device(s), one or more other user devices), cell sites, content provider(s), cloud data repository(s) such as via a network, to receive and transmit data. When communication module 152 receives data, the module can pass on relevant portions of data to different modules of the monitoring system 150. Communication module 152 can be configured and/or programmed to receive, e.g., via a user interface of the mobile device, information indicative of a boundary around the mobile device. For example, the user may use a responsive touch screen display, gesture recognition through touch input or via camera input (e.g., tapping, swiping, and pinching gestures), virtual keyboards, predictive text technology, voice input, and/or the like to indicate via communication module 152, where a boundary should be for the mobile entity. The communication module 152 may also receive signals indicative of an entity device (e.g., the device associated with the mobile entity) and may pass at least a portion of the data to device identification module 154, where the monitoring system 150 may identify the entity device.

Communication module 152 may receive a set of signals from the entity device, and may pass the signals to location determination module 156, that may use the set of signals to determine a location of the entity device, as described herein. Based on the location of the entity device as determined by location determination module 156, the feedback generation module 158 may generate feedback, e.g., to be transmitted to the entity device via communication module 152.

Figure 2A:
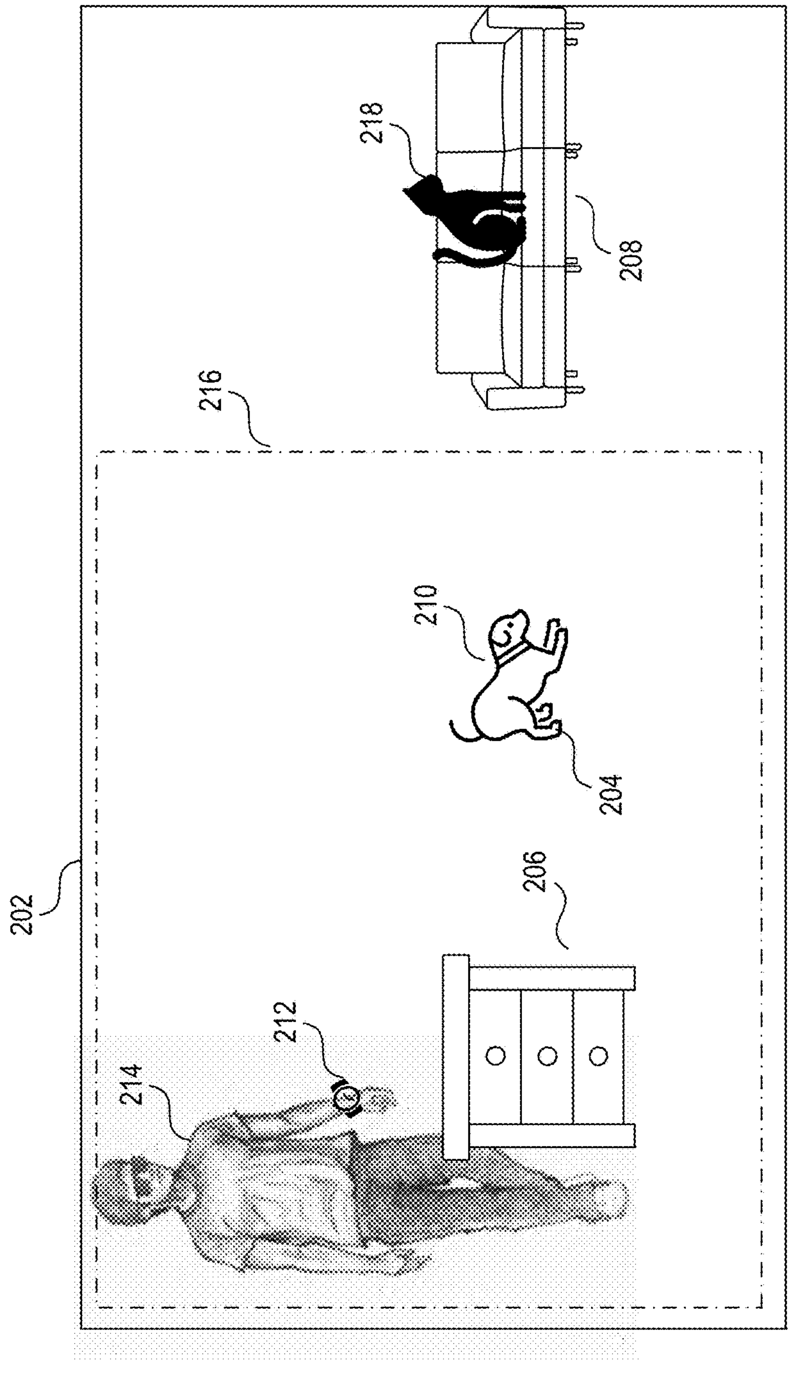
FIG. 2A is a diagram illustrating an exemplary environment including the components of a system for monitoring an entity within a threshold distance of a mobile device, in accordance with implementations of the present technology.
Figure 2A:
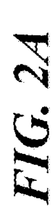
Figure 2B:
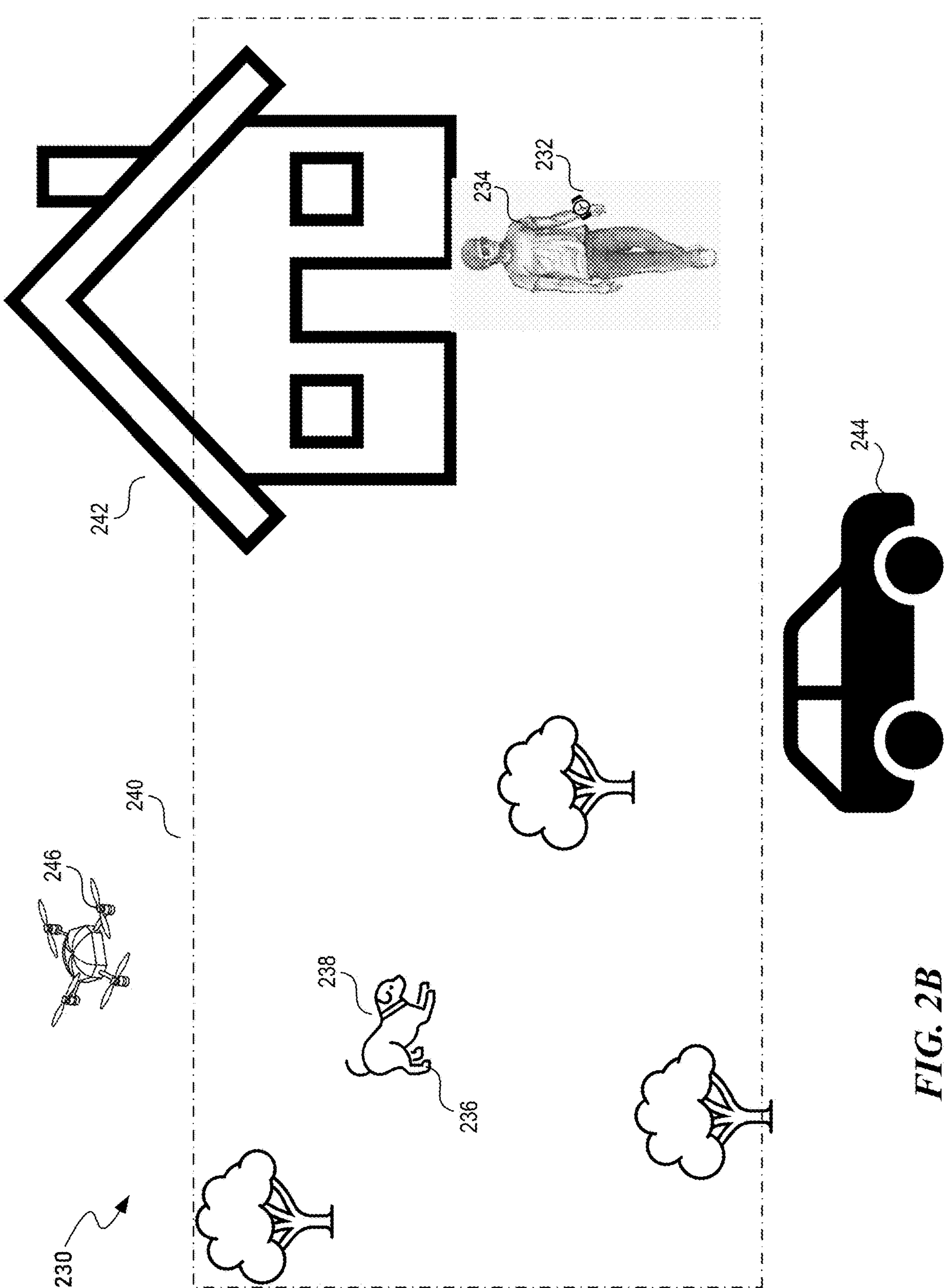
FIG. 2B is a diagram illustrating an exemplary environment including the components of a system having one or more drones for monitoring an entity, in accordance with implementations of the present technology.

FIGS. 2A and 2B are diagrams illustrating an exemplary environment including the components of a system for monitoring an entity within a threshold distance of a mobile device, in accordance with implementations of the present technology. For example, FIG. 2A illustrates a system 200 can include functional modules, such as the mobile device 212, entity device 210, and/or one or more drones 246, each implemented with a combination of software (e.g., executable instructions, or computer code) and hardware (e.g., at least a memory and processor). Accordingly, as used herein, a device may include a processor-implemented module or set of code and may also represent a computing device having a processor that is at least temporarily configured and/or programmed by executable instructions stored in memory to perform one or more of the specific functions described herein. For example, the environment of FIG. 2A may include the entity 204 (e.g., a mobile entity such as a pet) being monitored within a threshold distance of a mobile device 212.

The mobile device 212 (e.g., wireless device 104) may include a device with one or more processors, such as described below. The mobile device 212 may include aspects of monitoring system 150 described herein. The mobile device 212 can include mobile phones (e.g., smartphones), tablet computers, laptops, and so on), Internet of Things (IoT) devices, vehicles (e.g., smart vehicles), devices with sensors, and so on, and can be configured to receive and transmit data, stream content, and/or perform other communications or receive services over a telecommunications network. For example, the mobile device 212 accesses a telecommunication network via a cell site at a geographical location that includes the cell site, in order to transmit and receive data (e.g., stream or upload multimedia content) from various entities, such as a content provider, cloud data repository, and/or other user devices on the network and via the cell site.

The mobile device 212 may be associated with a user 214. The user 214 may be, for example, a caregiver or parent or primary custodian of an entity 204. The mobile device may receive, e.g., via a user interface of the mobile device, information indicative of a boundary (e.g., boundary 202) around the mobile device. For example, a user interface on a mobile phone encompasses various elements that facilitate interaction between the device and its user. Examples of a user interface may include a responsive touch screen display, gesture recognition through touch input or via camera input (e.g., tapping, swiping, and pinching gestures), virtual keyboards, predictive text technology, voice input, and/or the like.

The boundary may indicate or set bounds for a physical boundary past which the entity 204 is not permitted or enabled to move past, e.g., because the user may not desire the entity to move past the boundary. For example, the user 214 indicates via a user interface of the mobile device 212 and/or communication module 152, information indicative of a boundary 202 around the mobile device or the entity device 210. In some examples, information indicative of a boundary includes a distance, such as from the mobile device 212, past which the entity 204 is not enabled to move past. Alternatively or additionally, the boundary may include areas (e.g., indicated by bounded boxes or other shapes) within a larger area that the entity 204 is not permitted in. According to some implementations, the boundary is tethered to the mobile device. For example, the user can indicate that the boundary is 5 feet from the mobile device, such that the location of a boundary is dynamic when a user having the mobile device moves to a different position.

In order to determine, for example, a position of the entity, the mobile device may identify the entity 204 in one or more various ways, e.g., using device identification module 154. The entity 204 may have an entity device 210 associated with the entity. For example, the entity device 210 is attached to the entity 204 and/or within close proximity of the entity 204. In the example that the entity is a pet, the device can be at least partially incorporated in a chip inserted in the pet and/or an object attached to the pet (such as, a collar). The mobile device may identify the entity device 210 communicatively coupled to the mobile device. For example, the mobile device 212 can establish a communication network through which a communication exchange may occur. For example, the mobile device 212 may transmit and/or receive one or more signals with the entity device 210 to establish the presence of the entity device 210 (e.g., using Bluetooth®, Near Field Communication, Wi-Fi®, etc.). In one example, the entity is a pet having a wireless collar such as a remote training collar, GPS tracking collar, activity monitoring collar, and/or the like and may have cellular capabilities enabling data to be sent via one or more cell towers.

In one example, the mobile device 212 receives a set of signals from the entity device, e.g., via communication module 152, wherein each of the set of signals comprise a location of the entity device. For example, the set of signals comprises one or more data structures or payloads of a relative position of the entity (e.g., in relation to the mobile device) or an absolute position of the entity. In one example, the set of signals identifies the location of the device through trilateration, multi-lateration, or using global positioning system (GPS) technology. The mobile device may identify, to a user, the current location of the entity via the entity device. Upon determining that a current location of the second device is within a boundary buffer value from the boundary around the mobile device, the mobile device 212 may transmit a response signal to the entity device 210.

In other examples, the mobile device 212 receives a set of signals from the entity device and/or other devices that can be used to determine a location of the entity, e.g., using location determination module 156. For example, the entity device ay be equipped with short-range wireless (Bluetooth®). The distance of the entity device from the mobile device may be estimated based on a measured strength of a received signal from the entity device. For example, the strength of the short-range wireless (Bluetooth®) signal attenuates with distance so by measuring the received signal strength (RSSI) of the Bluetooth® signal, the mobile device may estimate the approximate distance. The entity device may also perform the same estimation using signals from the mobile device and transmit the estimated distance. The mobile device may consider both in determining the distance.

In some examples, the mobile device 212 also determines an angle by using one or more Bluetooth® beacons or multiple Bluetooth® devices placed at known locations. For example, triangulation or trilateration techniques can be employed as described herein to determine the angle of the target device based on the relative signal strength received from the fixed devices (e.g., Bluetooth® beacons).

In the example of FIG. 2A, the user may indicate, e.g., via the user interface of the mobile device, a boundary buffer value, indicating a distance or margin from the boundary that serves as an additional safety margin to ensure that the intended boundary is not breached accidentally. For example, the entity 204 is within the boundary 202, but within a boundary buffer value (e.g., within boundary buffer 216). In a geofencing application that defines a virtual boundary around a restricted area, a boundary buffer value can be implemented to create a buffer zone around the designated perimeter. If a person or object enters this buffer zone (e.g., area between boundary buffer 216 and boundary 202), it may trigger a warning or alert to indicate proximity to the boundary without triggering the actual breach of the defined boundary.

According to some implementations, the boundary buffer value is static. Alternatively or additionally, the value may be dynamic and change based on a location of the entity device or the entity device's proximity to certain areas. In one example, the boundary buffer value is 2 feet from an entrance of a door, but may be 6 feet from a kitchen area. The user may indicate each of the boundary buffer values for different locations and areas via the user interface of the mobile device.

The response signal, e.g., as generated using feedback generation module 158, may be capable of providing feedback to an entity associated with the second device, such as feedback to deter the entity from moving beyond the boundary around the mobile device. According to some implementations, the feedback includes an audio signal, a video signal, a haptic signal, and/or a combination of the same. For example, when a child or pet approaches the boundary's edge (e.g., within the boundary buffer value), the response signal causes an emission of an audible warning or alert sound, animated indicators, or tactile responses to help the child or pet associate the boundary with different types of indicators.

In some examples, the response signal is tailored over time based on the entity's responsiveness to the response signal. For example, the entity device includes one or more sensors for detecting heartbeat, facial expression, etc., and can be used to detect whether the feedback is causing fear or anxiety in the entity. Alternatively or additionally, if the feedback does not have an effect on the entity, the system (e.g., the mobile device) may automatically cycle through or use a different combination of feedback.

In some implementations, the user records one or more messages for playback to the entity via the entity device and/or one or more drones responsive to determining that the entity is within the boundary buffer value from the boundary and/or has exceeded the bounds of the boundary. In one example, the entity device is configured to playback the recorded audio periodically once the entity device loses signal contact with the mobile device and/or exceeds the bounds of the boundary. The recorded audio includes contact information (e.g., email address, phone number) or entity identification information (e.g., entity's name, age, other identifying characteristics, etc.), e.g., to alert others and aid in tracking the entity.

Figure 2C:
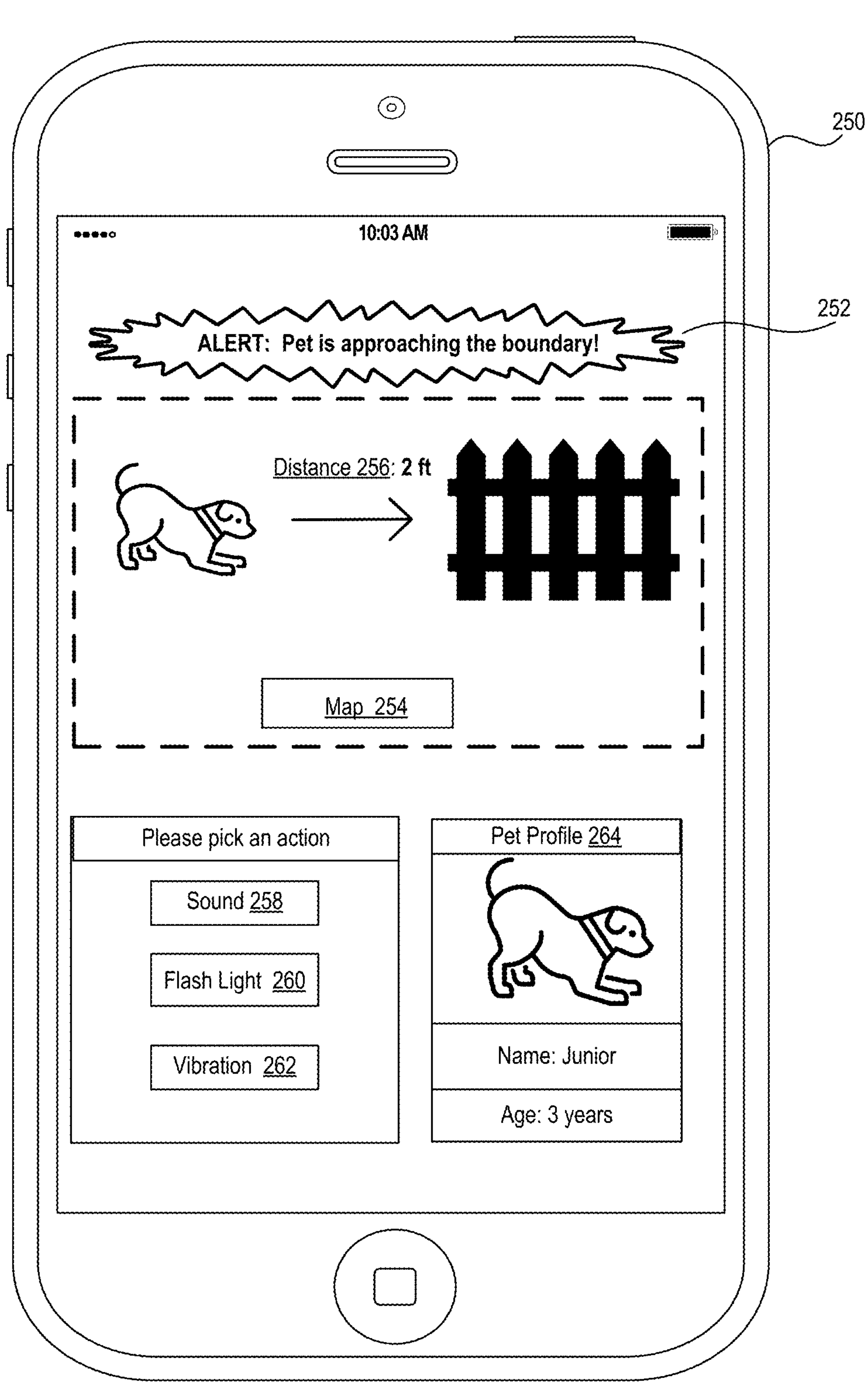
FIG. 2C is a diagram illustrating an exemplary user interface for a system for monitoring an entity, in accordance with implementations of the present technology.

For example, FIG. 2C is a diagram illustrating an exemplary user interface for a system for monitoring an entity, in accordance with implementations of the present technology. The user interface may be supplied on a device 250, such as a mobile device (e.g., mobile device 212, 232). A user of the mobile device may be alerted using a visual indicator that the pet is detected within the boundary buffer zone. In the example of FIG. 2C, the user is alerted with notification 252. The user may also be provided with a map 254 indicating the entity, the boundary, a proximity of the entity to the boundary, and/or the like. The map 254 can also include the boundary buffer value, one or more other entities detected, and/or live footage of the entity (e.g., as recorded by imaging sensors on the one or more drones or other image sensors coupled to the system).

Responsive to determining that the entity is within the boundary buffer value from the boundary, the mobile device may prompt the user to indicate whether to transmit a response signal to the entity device, and/or what kind of feedback to provide. For example, the mobile device indicates actions such as auditory feedback "sound" 258, a visual feedback "flashlight" 260, and/or a haptic feedback "vibrate" 262. The user may select one or more of the actions to provide feedback to the entity. The mobile device may generate a responsive signal based on the selected actions.

The user interface may also indicate details regarding the entity. In the example of FIG. 2C, the user interface provides a pet profile 264. The pet profile may include data regarding shape, size, name, age, etc. of the entity, as well as a visual image of the entity as well. In some embodiments, the pet profile includes several images of the entity used to train a recognition model to recognize the entity using image data, e.g., collected via the one or more drones, the user device, imaging sensors of devices of trusted users, and/or the like.

According to some implementations, the mobile device detects a presence of an additional entity (e.g., another animal in the vicinity of a pet). Responsive to detecting the presence of the additional entity, the mobile device generates a request to a user (e.g., user 214), e.g., the first request includes information indicative of the boundary. The mobile device may then receive, via a user interface of the mobile device, information indicative of a new boundary around the mobile device. In the example of FIG. 2A, the mobile device detects the presence of multiple entities, e.g., via devices attached or otherwise coupled to the entities, or based on sensor information (e.g., lidar). For example, the mobile device 212 detects dresser 206, sofa 208, and a pet 218.

Responsive to detecting the presence of the pet 218, the mobile device may automatically adjust the boundary dynamically, e.g., to prevent the entity 204 from coming into close contact with the pet 218. Alternatively or additionally, the mobile device prompts the user, e.g., via a request, to update the boundary 202 based on the presence of the pet. The user may input via a user interface of the mobile device an input indicating a change of boundary (e.g., new boundary) or an indication to maintain the boundary as is. For example, the user can choose to temporarily or permanently alter the boundary 202 to become closer to the mobile device.

In some implementations, based on the profile of the entity, the system is configured to readjust the boundary buffer value or boundary automatically, e.g., such that the entity is deterred from getting close to other entities whose presence has been detected. For example, if the entity's profile indicates that the entity is a friendly pet, the boundary might not be adjusted when the presence of another entity is detected. However, if the entity's profile indicates that the entity is an aggressive pet and prone to sensitivity around certain entities, the boundary or boundary buffer value may be adjusted to be closer to the entity so as to prevent the entity from being in close presence to other entities. In some implementations, the boundary and/or boundary buffer value is adjusted based on the type of other entity or a characteristic of the other entity. For example, a pet profile might indicate that the entity, a dog, is particularly fond of rabbits. If the system detects a rabbit, the boundary or boundary buffer value may be adjusted to be closer to the entity or a secondary boundary and boundary buffer value may be generated within the bounds of the boundary (e.g., around the rabbit) to prevent and/or deter the dog from coming close to the other entity, e.g., the rabbit. The boundary and/or boundary buffer value may be updated automatically and/or the mobile device may prompt the user to update the boundary and/or boundary buffer value.

In some examples, past interactions with other entities is logged and used. For example, if the entity, such as a dog, had a negative experience with a neighbor's dog, the boundary and/or boundary value is updated dynamically responsive to detecting the specific entity (e.g., the neighbor's dog). For example, the entity device, mobile device, and/or one or more drones detects a specific entity. The entity device, mobile device, and/or one or more drones may pair with or establish a communicative channel with a device associated with the specific entity. The device associated with the specific entity may transmit a signal indicative of an identifier identifying the specific entity. The boundary and/or boundary buffer value may be automatically updated or the mobile device may prompt the user (e.g., caretaker of entity) to update the boundary and/or boundary buffer value. In some examples, one or more imaging sensors (e.g., camera on a drone, mobile device, entity device, etc.) may capture one or more images of the specific entity, and a machine learning model may identify the specific entity using the one or more images as input.

In some implementations, a change in value of a biometric sensor automatically adjusts the boundary and/or boundary buffer value and/or prompt the user to adjust the boundary and/or boundary buffer value. For example, if a sensor coupled to the entity device identifies that the entity's heart rate or temperature and/or the like changes or exceeds a threshold, the system may identify that there is a presence or change in the environment and either change the boundary and/or boundary buffer value or prompt the user to change one or both.

According to some implementations, the mobile device is communicative coupled to a telecommunications network that administers a tracking service. The mobile device 212 and/or the user 214 may be subscribed to the tracking service. Responsive to determining the entity is lost, the mobile device 212 may transmit a notification of the lost entity to a set of trusted users received from the tracking service. For example, if the mobile device 212 does not receive a set of signals from the entity device 210 comprising a location of the second device, the mobile device transmits a notification to one or more other users, e.g., users who have subscribed to a same or different tracking service.

In one example, the devices of trusted users are capable of picking up a signal from the entity device, where the signal includes an entity identifier. For example, the trusted user device picks up the signal when the entity device comes within range automatically, such as by creating a wireless connection to establish a proximity link between the entity device and the trusted user's device. Upon establishing a proximity link, the trusted user's device may additionally alert the trusted user that an entity is nearby. The trusted user's device may also determine and/or present to the trusted user, a relative location of the entity as determined using techniques disclosed herein (e.g., Bluetooth® signal strength, etc.).

In another example, the trusted user device can scan a barcode (e.g., QR code) presented by the entity device to determine an entity identifier. Upon being scanned, the QR code reader may prompt the user to take specific actions, such as alert the user of the mobile device associated with the entity (e.g., a device of the caregiver), or automatically transmit the location of the entity device, e.g., via a cell tower. In another example, the entity device presents a unique symbol or code, e.g., on a display of the entity device, and transmit the unique symbol or code to the mobile device such that the user may identify that the user is the caregiver of the entity, e.g., at a hospital, police station, etc.

The mobile device 212 may additionally communicatively connect to multiple devices to track the entity. The devices may include one or more visual sensors disposed in the devices or have access to one or more visual sensors. Images and/or video data from the visual sensors may be used to determine whether the entity is recognized in one of the images and/or video data, and may be used to further determine a location, user identifier or device identifier of the device that generated the image and/or video data using the one or more visual sensors.

In some implementations, the mobile device also includes one or more drones communicatively coupled to the mobile device. For example, FIG. 2B is a diagram illustrating an exemplary environment including the components of a system having one or more drones 246 for monitoring an entity 236, in accordance with implementations of the present technology. In the environment 230 of FIG. 2B, the user 234 has mobile device 232 for monitoring the entity 236 via entity device 238.

The mobile device may identify one or more drones communicatively coupled to the mobile device. For example, the mobile device 232 can exchange one or more signals with the entity device 238 to establish the presence of the entity device 238 (e.g., using Bluetooth®, Near Field Communication, Wi-Fi®, etc.). Upon determining that the current location of the entity device is within the boundary buffer value from the boundary around the mobile device, the mobile device may transmit instructions, to the one or more drones, to move to the current location of the second device. For example, the mobile device identifies a relative or absolute position of the one or more drones 246, the relative or absolute position of the entity currently, and generates instructions or signals configured to cause the drones to relocate to be within a threshold proximity to the entity. The threshold proximity may be determined, for example, by the user. The one or more drones 246 may include one or more Time of Flight sensors and may cause the sensors to detect, relative to the location of the entity device, distance to the mobile device. The drones may also include cameras, visual displays, speakers, and/or the like, to provide feedback in addition to the entity device or alternative to the entity device.

According to some implementations, the one or more drones are used for perimeter fence monitoring. For example, drones can provide a bird's eye view of the entire perimeter, allowing the user to monitor the boundary or a physical fence and the surrounding areas from an elevated position. If the entity is approaching a boundary (e.g., within a boundary buffer value from the boundary), the drone may be deployed towards the entity and may be configured to follow the entity in the event that the entity continues past the boundary. The drone may be configured to stay within a threshold proximity to the entity in the event that the entity exceeds the bounds of the boundary, and may be configured to transmit location data, e.g., determined using GPS signals from satellites, visual data (e.g., live feed, camera feed of the entity), and/or biometric data (e.g., from one or more sensors on the entity or entity device) to a base station.

According to some implementations, a network of drones, that are connected to one another via a communication channel (e.g., via base stations, via Bluetooth©, radio, Zigbee®, Wi-Fi®, etc.) or through cell towers as disclosed herein. Any of the network of drones may be configured to detect a presence of an entity device when an entity device is within proximity (e.g., via Bluetooth®, Zigbee®, Wi-Fi®, etc.). In another embodiment, rather than a network of drones, an individual drone is able to track a location of the entity and entity device using an imaging sensor such as a camera. For example, the imaging sensor is be able to image and detect the entity from a far distance. In some examples, the range is further than the range between with a Bluetooth® or connectivity range between the mobile device and the entity device given that the field of view of the drone may exceed the ranges with which connectivity between the mobile device and entity device may occur. Additionally or alternatively, the drone may be communicatively coupled with sensors, e.g., with positioning technologies such as lidar. The drone may determine that the entity device has exceeded the boundary or within the boundary buffer value of the boundary based on communication from other drones, based on imaging, and/or based on sensor data from sensors communicatively coupled to the drone. The drone may then transmit an indication to the mobile device.

As described herein, the boundary buffer value may be static or may be dynamic and change based on a location of the entity device or the entity device's proximity to certain areas. For example, the mobile device detects a new location of the entity device based on a new set of signals from the entity device update, based on the current location of the second device. The new boundary buffer value may be determined based on a change in location of the second device.

In the example of FIG. 2B, the boundary buffer value is originally smaller to allow the entity to roam closer to a boundary around the house 242. However, upon detecting that the entity is at a position close to where a car 244 of the user is parked, the boundary buffer value may become larger so that the entity 236 can know earlier that a boundary is approaching and so that the entity 236 may be alerted further in advance. For example, the user may want to alert the entity 236 to be cautious and alert the dog at a distance further from the boundary.

Similarly, the user may input a list of locations or areas, each having their own predetermined boundary and boundary buffer values. The mobile device may receive, e.g., via a user interface of the mobile device, a list of locations, wherein each location in the list of locations comprises a corresponding predetermined boundary. Upon determining that the current location of the entity device is located at one or the locations on the list of locations, the mobile device may update the boundary buffer value based on the corresponding predetermined boundary.

According to some implementations, the mobile device is a virtual reality (VR) device, a mixed reality (XR) device, an augmented reality (AR) device, and/or the like. Similarly, the mobile device may be communicatively coupled to a VR device, a XR device, an AR device, and/or the like. The entity device may be integrated with the VR, XR, and/or AR device such that the user is enabled to track the entity in immersive platforms. For example, the user is enabled to play fetch or play games with the entity (e.g., dog) via VR, XR, and/or AR. In some implementations, the VR, XR and/or AR device is connected with other similar devices (e.g., via Wi-Fi®) to interact with each other. The user can play a game of fetch with the dog while talking to a friend via AR, XR, VR who may also be playing via their own device.

FIGS. 2A, 2B and 2C and the discussion herein provide a brief, general description of a suitable computing environment 200 in which the methods and techniques described herein can be supported and implemented. Although not required, aspects of the system are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, minicomputers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of a system for monitoring an entity within a threshold distance of a mobile device can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the mobile device 212, one or more drones 246 the entity device 210, and/or the devices of trusted users, can include network communication components that enable the devices to communicate with remote servers or other portable electronic devices by transmitting and receiving wireless signals using a licensed, semi-licensed, or unlicensed spectrum over communications network, such as a telecommunications network. In some cases, the telecommunications network can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the methods and techniques for monitoring an entity within a threshold distance of a mobile device will now be described.

Flow Diagram

Figure 3:
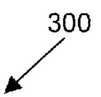
FIG. 3 is a flow diagram illustrating a process for monitoring an entity within a threshold distance of a mobile device, in accordance with implementations of the present technology.
Figure 3:
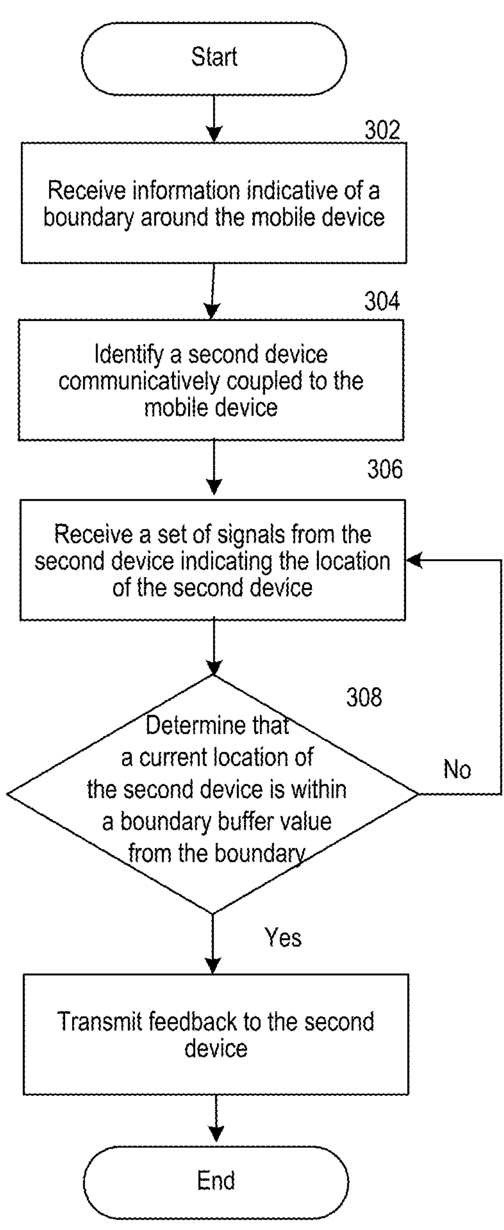

FIG. 3 is a flow diagram illustrating a process method for monitoring an entity within a threshold distance of a mobile device. Process 300 begins at block 302 where a system (e.g., mobile phone) receives information indicative of a boundary around the mobile device. At blocks 304, process 300 includes identifying a second device (e.g., entity device) communicatively coupled to the mobile device. Process 300 then proceeds to block 306 where a system receives a set of signals from the second device (e.g., entity device) indicating the location of the second device (as discussed in reference to the environment 200).

At block 308, process 300 includes determining that a current location of the second device (e.g., entity device) is within a boundary buffer value from the boundary. Upon determining that the current location of the second device is within a boundary buffer at block 308, the system transmits feedback to the second device. Otherwise, the system may repeat block 306.

Computer System

Figure 4:
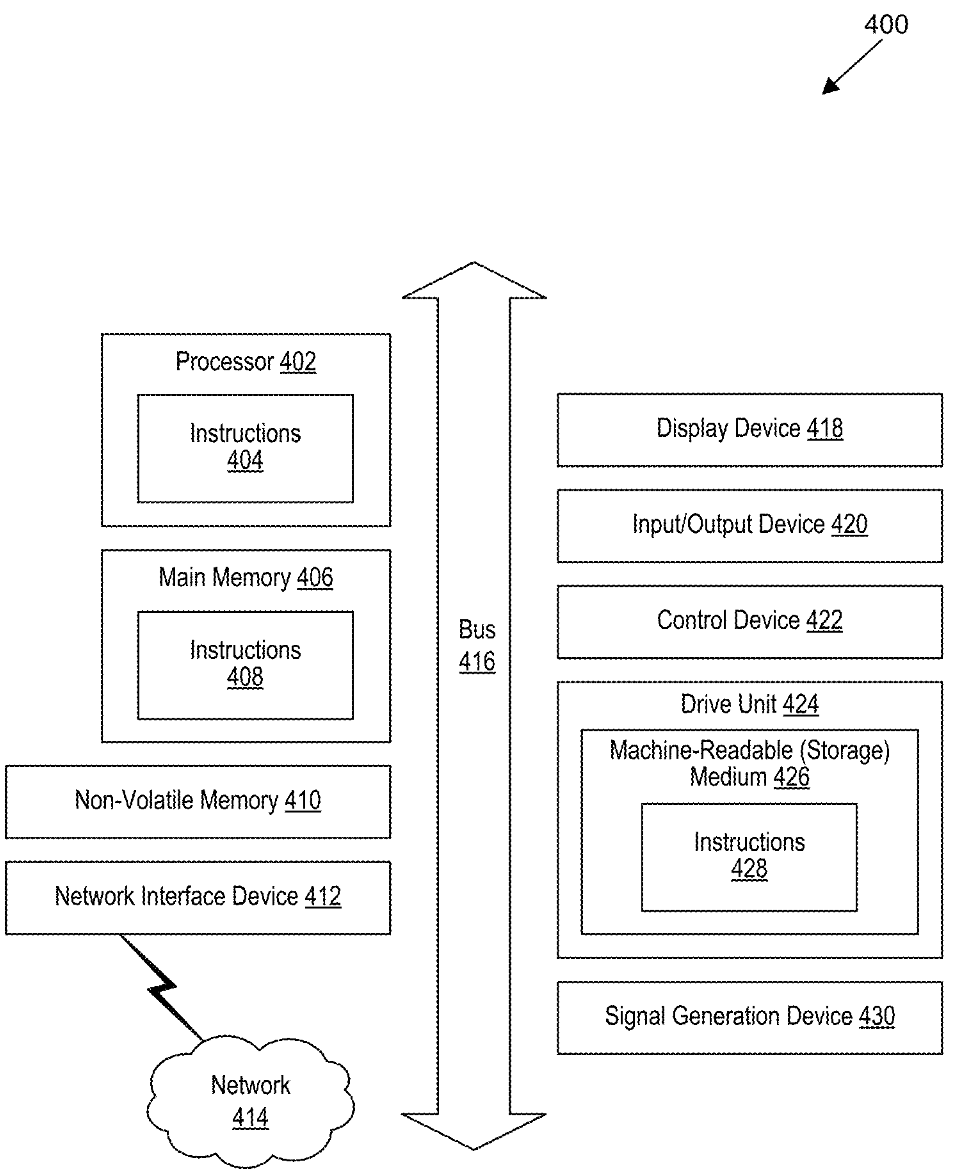
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 shares a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

1. Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system for monitoring an entity within a threshold distance of a mobile device, the system comprising:

one or more processors; and one or more memories configured to store instructions that when executed by the one or more processors perform operations comprising:

receiving, via a user interface of the mobile device, information indicative of a boundary around the mobile device;

identifying a second device communicatively coupled to the mobile device;

receiving a set of signals from the second device, wherein each of the set of signals comprise a location of the second device;

upon determining that a current location of the second device is within a boundary buffer value from the boundary around the mobile device, transmitting a response signal to the second device, wherein the response signal provides feedback to the entity that is associated with the second device, wherein the feedback deters the entity from moving beyond the boundary around the mobile device, and wherein the feedback comprises at least one of an audio signal, a video signal, or a haptic signal;

identifying one or more drones communicatively coupled to the mobile device;

upon determining that the current location of the second device is within the boundary buffer value from the boundary around the mobile device, transmitting instructions, to the one or more drones, to move to the current location of the second device; and transmitting instructions, to the one or more drones, to detect, using one or more Time of Flight (ToF) sensors, relative to the current location of the second device, distance to the mobile device, wherein the one or more ToF sensors are disposed in the one or more drones.

2. The system of claim 1, wherein the instructions further cause the one or more processors to perform operations comprising: communicatively coupling to a telecommunications network that administers a tracking service, wherein the mobile device is subscribed to the tracking service, and wherein in response to determining the entity is lost, transmit a notification of the lost entity to a set of trusted users received from the tracking service.

3. The system of claim 2, wherein the instructions further cause the one or more processors to perform operations comprising: communicatively connecting to multiple devices to track the entity, wherein the multiple devices are subscribed to the tracking service, and wherein one or more visual sensors are disposed in the multiple devices; and receive from the tracking service the entity was recognized.

4. The system of claim 1, wherein the instructions further cause the one or more processors to perform operations comprising: in response to detecting a presence of an additional entity, generating a first request to a user, wherein the first request comprises the information indicative of the boundary; and receiving, via the user interface of the mobile device, information indicative of a new boundary around the mobile device.

5. The system of claim 1, wherein the instructions further cause the one or more processors to perform operations comprising: detecting a new location of the second device based on the set of signals from the second device; and updating, based on the current location of the second device, the boundary, wherein a new boundary buffer value is determined based on a change in location of the second device.

6. The system of claim 1, wherein the instructions further cause the one or more processors to perform operations comprising: receiving, via the user interface of the mobile device, a list of locations, wherein each location in the list of locations comprises a corresponding predetermined boundary; and upon determining that the current location of the second device is located at a first location on the list of locations, updating the boundary buffer value based on the corresponding predetermined boundary.

7. A method for monitoring an entity within a threshold distance of a mobile device, the method comprising:

receiving, via a user interface of the mobile device, information indicative of a boundary around the mobile device;

receiving a set of signals from a second device, wherein each of the set of signals comprise a location of the second device;

upon determining that a current location of the second device is within a boundary buffer value from the boundary around the mobile device, transmitting a response signal to the second device, wherein the response signal provides feedback to the entity that is associated with the second device, wherein the feedback deters the entity from moving beyond the boundary around the mobile device, and wherein the feedback comprises at least one of an audio signal, a video signal, or a haptic signal;

identifying one or more drones communicatively coupled to the mobile device;

upon determining that the current location of the second device is within the boundary buffer value from the boundary around the mobile device, transmitting instructions, to the one or more drones, to move to the current location of the second device; and transmitting instructions, to the one or more drones, to detect, using one or more Time of Flight (ToF) sensors, relative to the current location of the second device, distance to the mobile device, wherein the one or more ToF sensors are disposed in the one or more drones.

8. The method of claim 7, wherein the method further comprises: communicatively coupling to a telecommunications network that administers a tracking service, wherein the mobile device is subscribed to the tracking service, and wherein in response to determining the entity is lost, transmit a notification of the entity to a set of trusted users received from the tracking service.

9. The method of claim 8, wherein the method further comprises: communicatively connecting to multiple devices to track the entity, wherein the multiple devices are subscribed to the tracking service, and wherein one or more visual sensors are disposed in the multiple devices; and receiving from the tracking service the entity was recognized.

10. The method of claim 7, wherein the method further comprises: in response to detecting a presence of an additional entity, generating a first request to a user, wherein the first request comprises the information indicative of the boundary; and receiving, via the user interface of the mobile device, information indicative of a new boundary around the mobile device.

11. The method of claim 7, wherein the method further comprises:

detecting a new location of the second device based on the set of signals from the second device; and updating, based on the current location of the second device, the boundary, wherein a new boundary buffer value is determined based on a change in location of the second device.

12. The method of claim 7, wherein the method further comprises: receiving, via the user interface of the mobile device, a list of locations, wherein each location in the list of locations comprises a corresponding predetermined boundary; and upon determining that the current location of the second device is located at a first location on the list of locations, updating the boundary buffer value based on the corresponding predetermined boundary.

13. A non-transitory computer-readable media containing instructions which when executed by a processor, perform a method for monitoring an entity within a threshold distance of a mobile device, the method comprising:

receiving, via a user interface of the mobile device, information indicative of a boundary around the mobile device;

receiving a set of signals from a second device, wherein each of the set of signals comprise a location of the second device;

upon determining that a current location of the second device is within a boundary buffer value from the boundary around the mobile device, transmitting feedback to the entity that is associated with the second device, wherein the feedback deters the entity from moving beyond the boundary around the mobile device, and wherein the feedback comprises at least one of an audio signal, a video signal, or a haptic signal;

identifying one or more drones communicatively coupled to the mobile device;

upon determining that the current location of the second device is within the boundary buffer value from the boundary around the mobile device, transmitting instructions, to the one or more drones, to move to the current location of the second device; and transmit instructions, to the one or more drones, to detect, using one or more Time of Flight (ToF) sensors, relative to the current location of the second device, distance to the mobile device, wherein the one or more ToF sensors are disposed in the one or more drones.

14. The non-transitory computer-readable media of claim 13, wherein the method further comprises: communicatively coupling to a telecommunications network that administers a tracking service, wherein the mobile device is subscribed to the tracking service, and wherein in response to determining the entity is lost, transmit a notification of the entity to a set of trusted users received from the tracking service.

15. The non-transitory computer-readable media of claim 14, wherein the method further comprises: communicatively connecting to multiple devices to track the entity, wherein the multiple devices are subscribed to the tracking service, and wherein one or more visual sensors are disposed in the multiple devices; and receiving from the tracking service the entity was recognized.

16. The non-transitory computer-readable media of claim 13, wherein the method further comprises: in response to detecting a presence of an additional entity, generating a first request to a user, wherein the first request comprises the information indicative of the boundary; and receiving, via the user interface of the mobile device, information indicative of a new boundary around the mobile device.

17. The non-transitory computer-readable media of claim 16, wherein the method further comprises detecting the presence of the additional entity by:

capturing, using one or more imaging sensors, a plurality of images; and inputting the plurality of images into a machine learning configured to detect the additional entity.

18. The non-transitory computer-readable media of claim 13, wherein the method further comprises: receiving, via the user interface of the mobile device, a list of locations, wherein each location in the list of locations comprises a corresponding predetermined boundary; and upon determining that the current location of the second device is located at a first location on the list of locations, updating the boundary buffer value based on the corresponding predetermined boundary.

19. The non-transitory computer-readable media of claim 13, wherein the method further comprises:

responsive to detecting a change in value of a biometric sensor, automatically adjusting the boundary buffer value.

20. The non-transitory computer-readable media of claim 13, wherein the method further comprises: responsive to detecting a change in value of a biometric sensor, prompting a user to adjust the boundary buffer value.

* * * * *